(12) United States Patent
Iverson (10) Patent No.: US 9,068,599 B2
(45) Date of Patent: Jun. 30, 2015

(54) ALL GRAPHITE INTERFEROMETER BEARING ASSEMBLY

(71) Applicant: Thermo Electron Scientific Instruments LLC, Madison, WI (US)

(72) Inventor: John R. Iverson, Stoughton, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

(21) Appl. No.: 14/133,174

(22) Filed: Dec. 18, 2013

(65) Prior Publication Data

US 2014/0169706 A1     Jun. 19, 2014

Related U.S. Application Data

(60) Provisional application No. 61/739,236, filed on Dec. 19, 2012.

(51) Int. Cl.
| | |
|---|---|
| *F16C 29/02* | (2006.01) |
| *F16C 33/16* | (2006.01) |
| *G01J 3/02* | (2006.01) |
| *G01J 3/06* | (2006.01) |
| *G01J 3/453* | (2006.01) |

(52) U.S. Cl.
CPC ............... *F16C 33/16* (2013.01); *F16C 29/02* (2013.01); *G01J 3/0202* (2013.01); *G01J 3/06* (2013.01); *G01J 3/4535* (2013.01)

(58) Field of Classification Search
CPC ........ F16C 29/02; F16C 33/16; G01J 3/0202; G01J 3/0259
USPC .................. 384/29, 32, 42; 359/200.1, 221.3, 359/819–830
See application file for complete search history.

(56) References Cited

U.S. PATENT DOCUMENTS 5,883,712 A * 3/1999 Coffin ........................... 356/452
5,896,197 A    4/1999 Coffin

FOREIGN PATENT DOCUMENTS

GB          602484          5/1948

* cited by examiner

*Primary Examiner* — Phillip A Johnson
(74) *Attorney, Agent, or Firm* — Ion C. Abraham (57) ABSTRACT

An all-graphite interferometer bearing assembly is introduced that allows the movement of a movable mirror in a Michelson interferometer without degradation during use. The assembly includes a stationary hollow graphite tube and a movable assembly which includes a mirror and a monolithic graphite member slidably disposed within the bore of the graphite tube that is composed of the same grade of graphite material as the monolithic graphite member. The result is a robust novel moving mirror arrangement in a Michelson interferometer that enables precise mirror alignment control, a long stroke length, excellent vibration damping and reduced sensitivity to external vibrations.

6 Claims, 4 Drawing Sheets

ALL GRAPHITE INTERFEROMETER BEARING ASSEMBLY

BACKGROUND OF THE INVENTION

1. Field of the Invention

The present invention relates to the field of optical scientific instrumentation. More specifically, the present invention relates to an all-graphite bearing assembly as part of a Michelson interferometer.

2. Discussion of the Related Art

An optical interferometer used in a scientific analytical instrument relies on the interference of superimposed optical beams as part of the interrogation means. When configured as a Michelson Fourier-Transformed infrared (FTIR) instrument, the optical output of the interferometer is called an interferogram. The FTIR interferometer itself often includes a beam splitter and two mirrors, one that is conventionally stationary, and one which is conventionally mobile. The mobile mirror moves along the optic axis while staying optically perpendicular to the light beam at all times. The movement of the mobile mirror is often desired to be feedback-controlled in order to hold the mirror velocity constant so that the analytical radiation that passes through the interferometer produces an accurate interferogram. Moreover, the mobile mirror is also often part of an assembly that includes either air bearings or mechanical pivot-type bearings which require costly close tolerance machining and assembly for controlling the tilt of the movable mirror as it moves. Air bearings offer higher performance but are expensive and require an air compressor and filter to supply compressed air. Mechanical pivot-type bearings can have errors in the mirror alignment as the mirror moves. Such alignment problems worsen at long stroke lengths, thus limiting the stroke length and system resolution. Moreover, these types of bearings are subject to wear and degradation. In addition, mechanical bearings also have poor damping and tend to capture or generate mechanical and acoustical vibrations, thereby causing noise in the system output data.

To somewhat address the aforementioned conventional problems, a mirror assembly was manufactured that utilized graphite/glass combinations as part of the construction. Such an assembly is described and claimed in, U.S. Pat. No. 5,896,197, entitled, "INTERFEROMETER HAVING A GLASS GRAPHITE BEARING" issued Apr. 20, 1999, to John M. Coffin, the disclosure of which is incorporated by reference in its entirety, including the following: "[a] bearing for allowing the movement of a movable mirror in a Michelson interferometer includes a stationary hollow glass cylinder and a movable assembly which includes the movable mirror and at least one graphite member, the graphite member being slidably disposed within the bore of the glass cylinder." Part of the basis for such an assembly was to beneficially improve vibration damping because of predictable friction between the different parts and also reduce costs because it enabled low power control systems due to the lightweight nature of the configuration. However, such assemblies have inherent problems in manufacturing and reliability. For example, current manufacturing processes for such glass/graphite configurations calls for hand fitting of the glass tube to the piston, which often leads to large variances between batches of parts. Another problem encountered with such assemblies is that surface imperfections in the glass tube often result in tilt and drive jitter during operation of the final assembly in the interferometer. Finally, buildup of friction of the graphite piston, as evidenced by graphite dust in the glass tube, resulted in the need for higher drive voltages to be applied and such buildup eventually causes system downtime based on the need to clean the glass tube and graphite piston periodically.

Accordingly, the present invention addresses the need for an improved moving mirror assembly system as utilized in scientific optical interferometers, such as, a Fourier Transform infrared (FTIR) interferometer. In particular, such a novel design, as disclosed herein, provides for an improvement of the design cited in U.S. Pat. No. 5,896,197, to include but of which is not limited to: manufacturing parts of the assembly with tolerances and surface finishes that reduces friction and stiction of coupled parts, enabling tighter tolerances so as to improve system performance such as reduced, jitter and further reduction of the weight of the overall assembly which provides for low power control systems to be utilized for actuating the movable mirror while also enabling higher scanning speeds.

SUMMARY OF THE INVENTION

The present invention provides for an improved all-graphite bearing assembly as part of the moveable mirror portion of a Michelson interferometer. Reducing the weight of the assembly also enables low cost and low power control systems to be utilized for actuating the movable mirror, and high scanning speeds can be achieved for evaluating rapidly changing samples. The assembly itself incorporates a hard non-dusting graphite material that reduces wear so as to substantially eliminate drive voltage issues and the need to clean bearings in the field. Moreover, the use of such an all-graphite bearing assembly provides for increased consistency between parts and batches, substantially eliminates matching sets of parts, enables an ability to have more than one vendor (i.e., no longer limited to a single source for a part that is critical to the technology), and enables a more forgiving levitation strength. The result is a novel moving mirror arrangement in a Michelson interferometer that enables precise mirror alignment control, a long stroke length, excellent vibration damping and reduced sensitivity to external vibrations.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Specific Description

As stated above, U.S. Pat. No. 5,896,197, entitled, "INTERFEROMETER HAVING A GLASS GRAPHITE BEARING" issued Apr. 20, 1999, to John M. Coffin, incorporated a bearing that included a stationary hollow glass cylinder and a moveable assembly that utilized a graphite member being slidably disposed within the bore of the glass cylinder. As also stated above, such an assembly, while beneficial in some aspects nonetheless resulted in inherent problems in manufacturing and reliability. The present example configurations overcome such problems by using all graphite bearing combinations as to be discussed in detail hereinafter.

Figure 1:
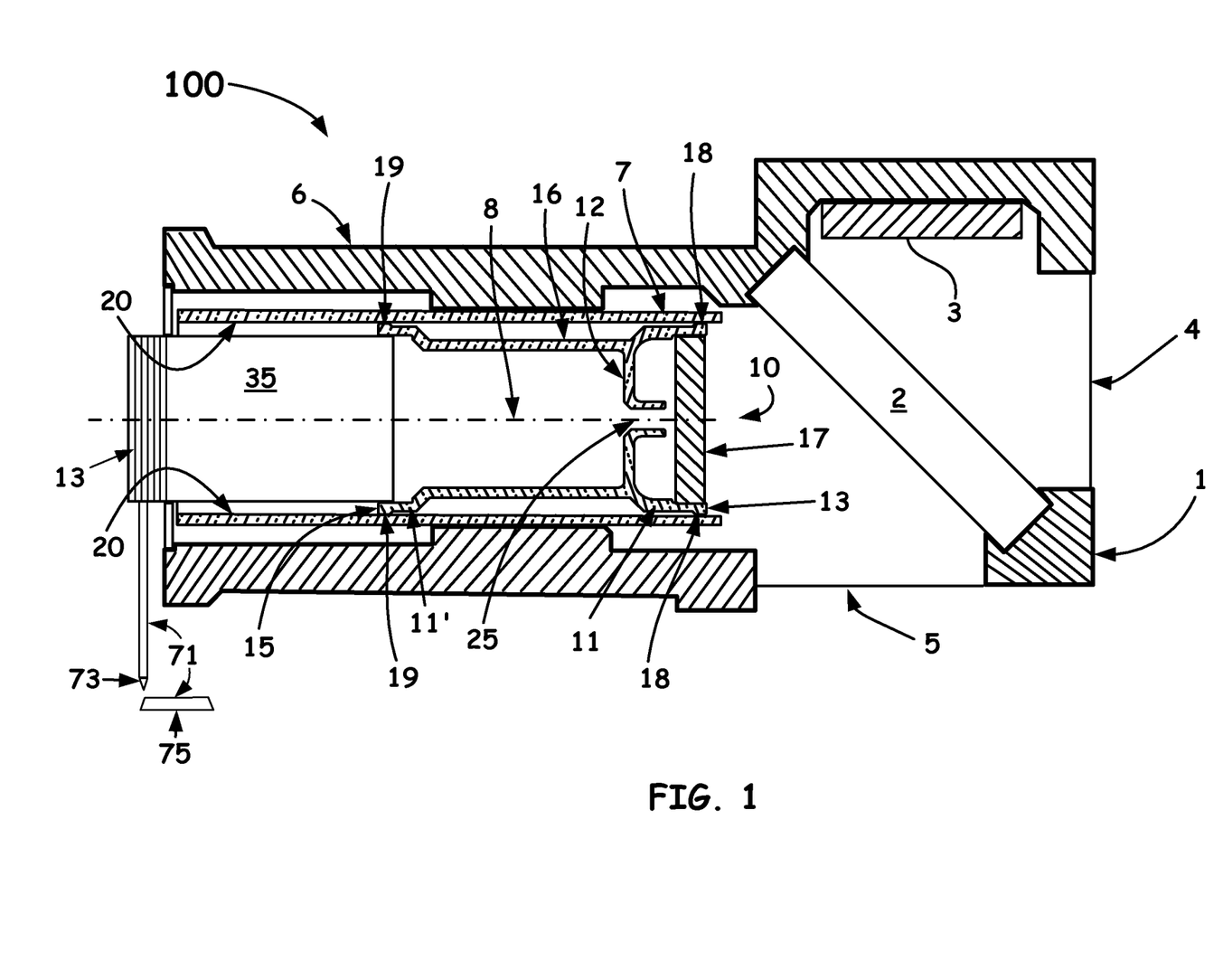
FIG. 1 shows a sectional view of an interferometer disclosed herein.
Figures 2A, 2B:
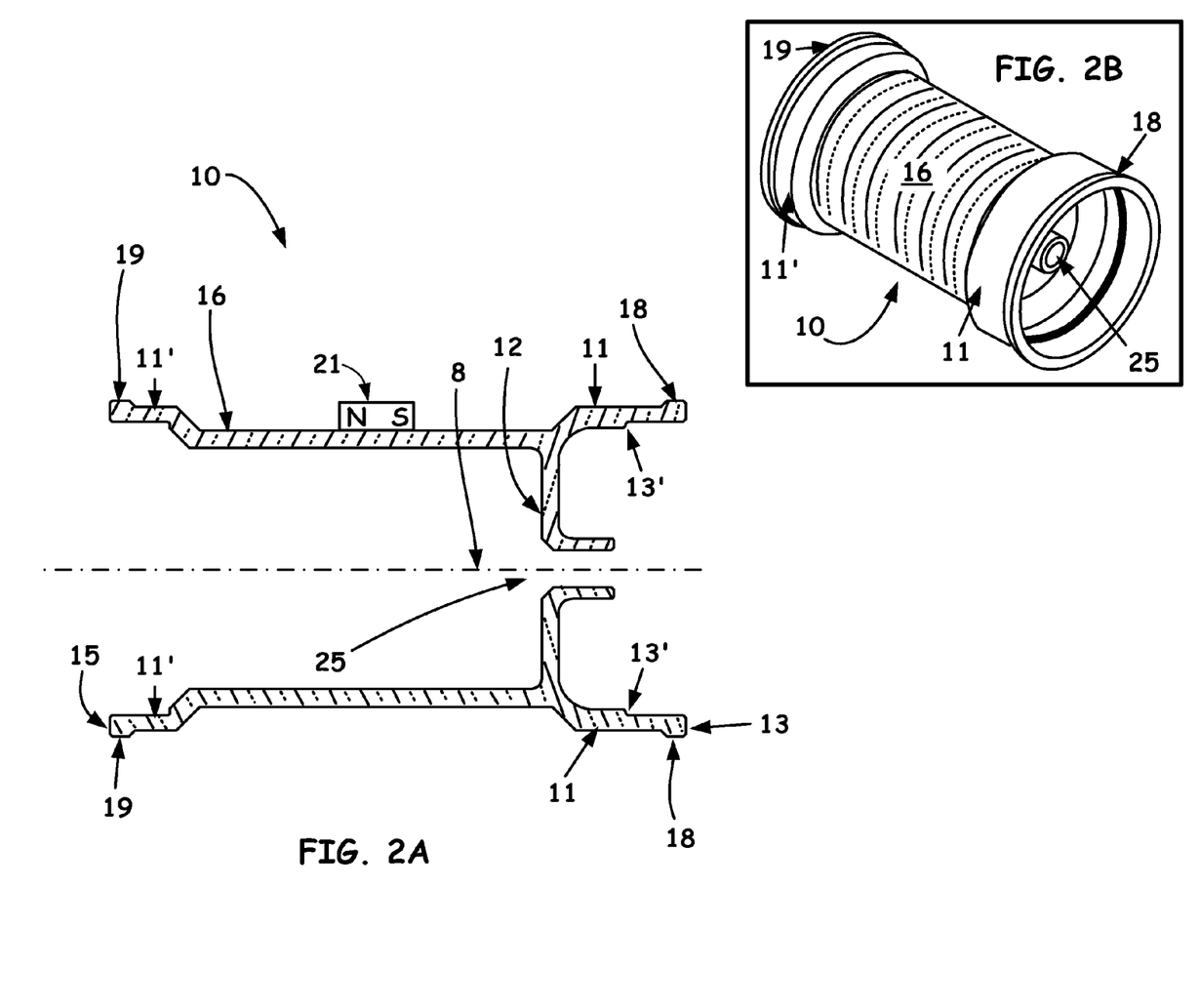
FIG. 2A shows a sectional view of a portion of the moveable assembly of the interferometer shown in FIG. 1.
FIG. 2B shows a 3D perspective view of the portion of the moveable assembly shown in FIG. 2A.

Turning to the drawings, FIGS. 1 and 2A and 2B show such an example embodiment of a novel moving interferometer all-graphite bearing assembly. FIG. 1 in particular shows a sectional view of an example interferometer, such as but not limited to, a Michelson interferometer, as generally referenced by the numeral 100, having a rigid base 1 on which is mounted a beam splitter 2, a fixed mirror 3, a first conduit 4 for incoming light and a second conduit 5 for outgoing light. The beam splitter 2, fixed mirror 3 and conduits 4 and 5 are constructed and positioned according to conventional Michelson interferometer designs.

As a general principle of operation, an input beam of infrared radiation from a source (not shown) is directed through the first conduit 4 and is received by the beam splitter 2. The fixed mirror 3 thereafter receives and returns a first beam over a fixed length optical path from the beam splitter 2. An adjustable plane mirror as part of a moveable assembly, to be discussed below, receives and returns a second beam over a variable length optical path from the beam splitter 2. The optical path length of the second beam between the beam splitter 2 and the adjustable plane mirror is generated by one or more control instruments (not shown) to provide for optical path differences between the first and second beams. The beams are combined at the beam splitter 2 and directed through the second conduit to enable a resultant interferogram to be measured. However, while the discussion is directed to Michelson configurations, it is to be understood that the graphite bearing configurations disclosed herein, can also be utilized in other optical/mechanical instruments, as known to those skilled in the art, wherein it is desired to capitalize on the beneficial aspects provided by the combinations.

In the specific embodiment of FIG. 1, the rigid interferometer base 1 (as also denoted by solid lines) has an integrally formed hollow cylindrical 6 portion configured to receive the moveable mirror assembly, as denoted generally by the reference numeral 10. The base 1 itself is often a solid material that is desirably constructed from a ferrous or carbon alloy such as cast iron or steel. A stationary hollow graphite tube 7 is fixedly coupled to the inner diameter of the cylindrical sleeve 6 portion having a central axis 8. Disposed concentrically within the bore of the graphite tube 7 (graphite materials denoted with solid and dashed lines) is the moveable mirror assembly 10 which can slide along a path parallel to the axis 8 of the graphite tube 7, and which operates in combination with the graphite piston embodiments disclosed herein, as a bearing surface. Also shown is a passive or an active magnetic anti-rotation system 71 often configured with magnetic means 73 and a stationary guide rail 75 positioned substantially parallel to the axis of rotation and at a predetermined radial distance from the moveable mirror assembly 10 for stabilization.

The moveable mirror assembly 10, which is depicted in detail in FIG. 2A with FIG. 2B giving the reader a 3D perspective, includes a first graphite piston 11 and a second graphite piston 11', each of which are in the shape of a cup. The first graphite piston 11 has a closed end 12 and an open end 13. By contrast, the second graphite piston 11' has only an open end 15 configured to receive a movement means, such as, but not limited to a movement coil 13 coupled to a coil support tube 35, as shown in FIG. 1.

It is to be noted the movement means of FIG. 1 can include any of the embodiments disclosed in U.S. Pat. No. 5,896,197 and as stated above, is incorporated by reference in its entirety. In particular with respect to the present application, the coil support tube 35 can be constructed of aluminum, KAPTON, available from E.I. du Pont, Nomex®. Epoxy or a similar adhesive can be used to fix the coil support tube 35 to the end of the graphite piston 11.

With respect to the coil designated by the reference character 13, it is often a coil of conductive wire or often a voice coil wrapped around an outside portion of the coil support tube 35. The coil 13 (i.e., a voice coil) can be configured over the full length of the coil support tube 35, but often extends only over a length which is slightly greater than the desired stroke length. For example, if the desired stroke length is about 2 inches, the voice coil 13 should extend over about 2.25 to 2.60 inches of the coil support tube 35. Lead wires (not shown) couple the voice coil to a generating source (not shown).

The voice coil 13 is desirably configured with a length so that at least a portion of it is inside a designed magnetic flux field generated by a magnet assembly (not shown) during operation of the interferometer. When the voice coil 13 has current flowing through it and is within the magnetic flux field, an electromagnetic force results to direct the overall moveable mirror assembly 10 along the axis 8 of the graphite tube 7.

Turning back to FIG. 2A and FIG. 2B, the first piston 11 often has a configured aperture 25 to facilitate handling during assembly. A spacer portion 16 is shown integrally formed with the closed end 12 of the first graphite piston 11 and is additionally integrally formed with the second graphite piston 11'. The spacer portion 16 is thus of the same graphite material (e.g., a graphite configured with particles sizes of less than 15 microns but more often configured with particle sizes of between 2 microns up to about 5 microns, as denoted with solid and dashed lines) utilized in the manufacturing (e.g., machining or molding) of the tube 7 as well as the first 11 and second pistons 11'.

A portion of the circumferential surface of a mirror 17, as shown in FIG. 1, is often configured flush against the inner surface of the wall at the open end 13 of the first graphite piston 11 for support and is provided with a stop, e.g., a detent as 13' denoted in FIG. 2A for positioning. Often the mirror is coupled to the first graphite piston 11 with an adhesive, such as epoxy. The mirror 17 specifically is planar in configuration and configured with an integral surface having a reflectivity of at least 98% at normal incidence that is useable in the ultraviolet (UV) up to the far-infrared (Far-IR) but preferably usable in the infrared spectrum of about 2 microns up to about 20 microns. The reflective surface itself can be applied via any known means in the art, such as, but not limited to deposition (e.g., electrolysis, vacuum deposition) of aluminum, silver, copper, or nickel, but more often gold. As an alternative, broadband or narrowband multilayer coatings can be applied (e.g., via vacuum deposition or sputtering) to also increase the reflectivity up to at least 99.999% for predetermined wavelengths received at the resultant mirror surface. Moreover, protective overcoat materials (e.g., aluminum oxide ($AlO_2$), Silicon Oxide ($SiO_2$) or Magnesium Fluoride ($MgF_2$)) can also be added if desired (but is not required) prior to final finishing to improve the robustness of the overall design.

Since the mirror 17 is coupled to the first graphite piston 11, it is apparent that, as the assembly 10 moves, the mirror 17 moves with respect to the beam splitter 2 along a line corresponding to the axis 8 of the graphite tube 7.

The first and second graphite pistons 11 and 11' whose outer surfaces can operate as bearing surfaces if desired, often instead but not necessarily, have bearing ring surfaces 18 and 19, respectively, which oppose an inner surface 20 of the graphite tube 7. The outer surface of the spacer portion 16, conversely, does not contact the inner surface 20 of the graphite tube 7. Thus, as part of the design, the assembly 10 is more often supported by and slides within the graphite tube 7 via the bearing surfaces 18 and 19.

In contrast to the configurations disclosed in U.S. Pat. No. 5,896,197 that used glass/graphite combinations, using allgraphite materials, specifically graphite often having particles sizes of about 2 microns up to about 5 microns in construction of the bearing surfaces enables the sliding of the assembly 10 within the graphite tube 7 to operate very smoothly. The secondary benefits of using graphite often having particles sizes of about 2 microns up to about 5 microns in the assembly thus eliminates the hereinbefore problem of imperfections based on the tube being glass, e.g., it eliminates hand fitting of parts that resulted in variances that added to tilt and drive jitter during operation of the final assembly in the interferometer. In addition, the capability of manufacturing the preferred material to design specifications and based on the beneficial inherent properties of such mated materials also beneficially results in the mitigation of the buildup of friction of the graphite piston. This aspect results in lower drive voltages to be applied while also decreasing system downtime for cleaning. In other words, the all-graphite bearing assembly disclosed herein provides for a huge cost savings.

Graphite specifically, as known to those skilled in the art, is naturally self-lubricating and does not require any additional fluids to reduce friction when used as a bearing, and has an extreme temperature resistance, able to maintain its structure and shape even in temperatures up to 5000° F. Moreover, graphite is not susceptible to damage as a result of thermal shock. To further smooth out the surface of the bearing and prevent any problems that may occur during extended use, the fabricated bearings via the incorporation of graphite materials can also be put through post processing secondary operations, such as, but not limited to, being impregnated with a resin to reduce porosity, thus making it even less susceptible to interior wear and tear. In some cases metal alloys may be added to improve the compressive strength.

Initial results for the manufactured parts using various grades of materials (e.g. grades of graphite) indicate tell-tale undesirable signs of high particle counts (i.e., dust) and metallic markings and cracking of surface interfaces during somewhat extended experimental use. However, through further experimental analysis, better tooling during the machining process, and via incorporation of a preferable graphite material, i.e., a non-dusting graphite (e.g., a graphite often having particles sizes of about 2 microns up to about 5 microns, a density of about 1.8 $g/cm^3$, a flexure strength of about 57 MPa up to about 86 MPa, and a Coefficient of thermal expansion (CTE) of 5.5 $10^{-6}/C.°$ up to about 7.5 $10^{-6}/C.°$), dust particles during use and cracking of the tube 7 are mitigated. Such graphite material in particular with a higher density and finer grain size provides for a longer fixture life for the embodiments herein and also such a material has excellent flexure strength and a higher hardness that enables an even greater resistance to erosion in abrasive applications, such as when utilized in the embodiments of the present application. However, while such a material has been found to be preferable in the assemblies depicted herein, it is also understood that other materials may still be utilized (e.g., carbon, carbon/graphite, alloys, graphite alloys, different grades of graphite, etc.) if able to conform to the specifications of the present invention. The desired effect in any case is that the fabrication of the bearings disclosed herein via for example, molding and/or machining can provide for dimensionally stable interfaces during movement without wear.

In the present application, using the preferable graphite material disclosed herein, the clearance between the graphite bearing surfaces 18 and 19 and the inner surface 20 of the graphite tube 7 can be very small, e.g., within about 0.001 to 0.007 inches but also as importantly, such design specification clearances can be reliably met based on the aforementioned current manufacturing processes and because of the chosen mated graphite material. This small clearance and the viscosity of air helps trap air which acts as an additional support for increasing the stiffness of the graphite/graphite bearing. The bottom line is that the all non-dusting graphite bearing assembly, as disclosed herein, provides for increased consistency between parts and batches, substantially eliminates matching sets of parts, enables an ability to have more than one vendor (i.e., no longer limited to a single source for a part that is critical to the technology), and enables a more forgiving levitation strength, as to be discussed below.

Additionally, using such a beneficial material for the embodiments disclosed herein and because of the capability of precise machining and molding means, the dimensions of the graphite tube 7 and the assembly 10 can be selected to obtain the desired stroke length, which is directly proportional to the resolution of the interferometer. Beneficially, the length of the graphite tube 7 is up to about 5 inches, the length of the moveable assembly 10 measured from the open ends 13 and 15 of the graphite pistons is about 3 inches, the diameter of the bore of the graphite tube 7 is up to about 1.75 inches with an outer diameter of about 2.07 inches and the inner diameter of the open ends 13 and 15 is about 1.43 and 1.53 inches respectively. Using such specification provides a stroke length of about 2 inches but it is to be noted that the specifications can change to include any stroke length conformable to a desired instrument.

The assembly 10 also can include a lift magnet 21, as shown in FIG. 2A, which is located on the outer surface of the spacer portion 16. As a desirable and surprising result, because of the use of the all-graphite material arrangement being of less weight than that disclosed in U.S. Pat. No. 5,896,197, the lift magnet 21 can be positioned closer to the center of gravity of the assembly to aid in assisting in movement. Specifically, if the interferometer is utilized so that the moveable assembly 10 is in a horizontal position, the attraction between the lift magnet 21 placed on the upper portion of the spacer portion 16 and the metal of the interferometer hollow cylindrical 6 portion better assists the movement of the assembly 10 than that disclosed in U.S. Pat. No. 5,896,197 (i.e., by the lift magnet being placed at the center of gravity of the assembly 10). Such an arrangement partially alleviates the frictional resistance between the assembly 10 and the lower half of the graphite tube 7. The end result is that it makes the selection of the levitation strength more forgiving, as stated above, for the magnetic couplings. This benefit is notably important from the previous designs disclosed in U.S. Pat. No. 5,896,197 because the magnitude of the attraction between the lift magnet 21 and the interferometer block sleeve 6 must not interfere adversely with the movement of the assembly 10.

Figure 3:
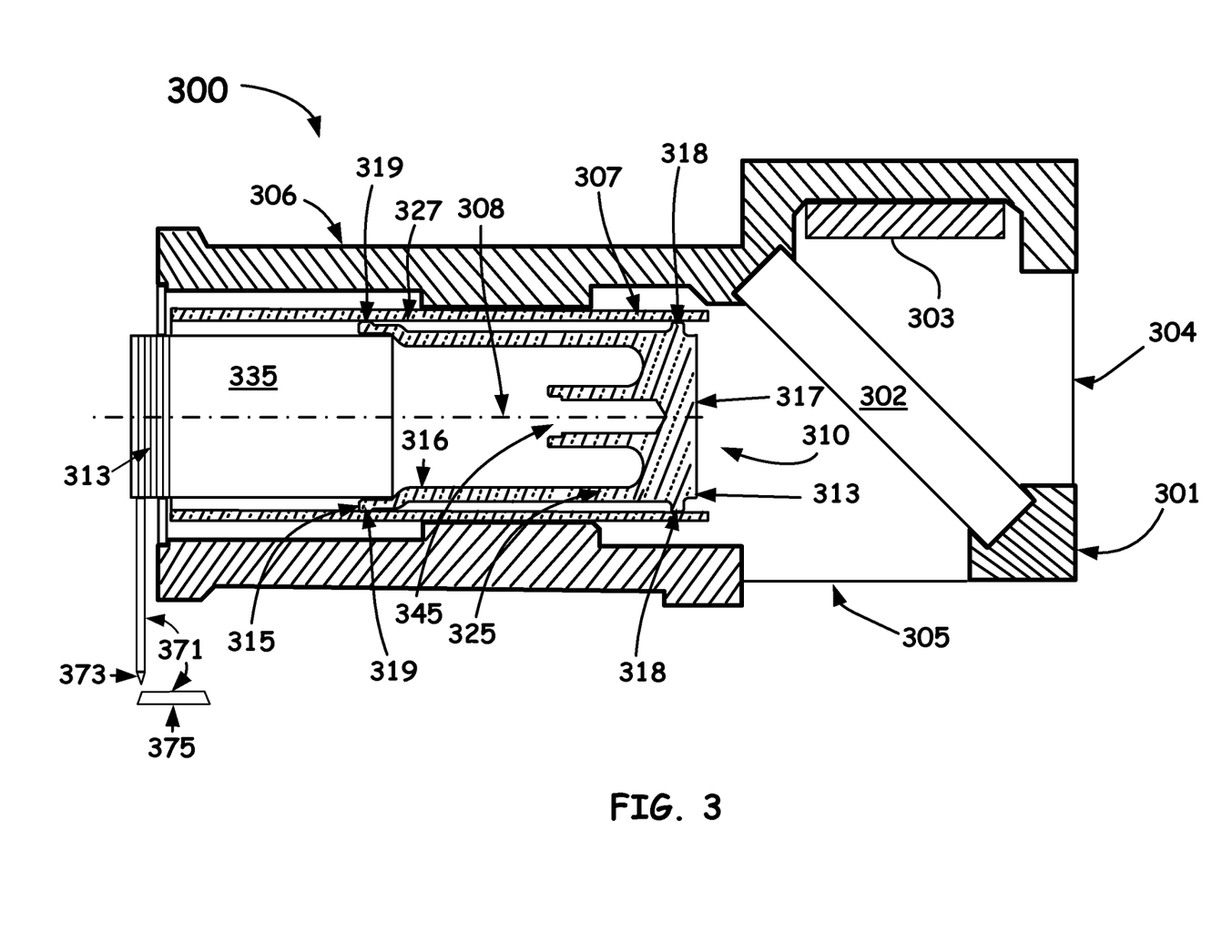
FIG. 3 shows a sectional view of a second example configuration of an interferometer disclosed herein.

As another example beneficial embodiment of the present application, FIG. 3 shows a Michelson interferometer, now generally designated by the reference numeral 300. FIG. 3 thus shows, similar to FIG. 1, a beam splitter 302, a fixed mirror 303, a first conduit 304 for incoming light, a second conduit 305 for outgoing light but in contrast to FIG. 1, a novel configured mirror surface 317 integral as part of the moveable mirror assembly 310, as to be discussed in detail below. As stated above in the discussion of the example embodiment of FIG. 1, while the discussion is directed to Michelson configurations, it is to be understood that the graphite bearing configurations disclosed herein, can also be utilized in other optical/mechanical instruments, as known to those skilled in the art, wherein it is desired to capitalize on the beneficial aspects provided by the combinations.

In the specific embodiment of FIG. 3, the interferometer base 301 (as also denoted by solid lines) again is shown with an integrally formed hollow cylindrical 306 portion configured to receive the moveable mirror assembly, as denoted generally by the reference numeral 310. The base 301, as before, is often a solid material that is desirably constructed from a ferrous or carbon alloy such as cast iron or steel. Similar to that of the example embodiment of FIG. 1 disclosed herein, a stationary hollow graphite tube 307, preferably, as before, fabricated from graphite having particles sizes of about 2 microns up to about 5 microns, a density of about 1.8 g/cm$^3$, a flexure strength of about 57 MPa up to about 86 MPa, and a Coefficient of thermal expansion (CTE) of 5.5 $10^{-6}$/C.° up to about 7.5 $10^{-6}$/C.°, is coupled to the inner diameter of the cylindrical sleeve 306 portion having a central axis 308. Disposed concentrically within the bore of the graphite tube 307 (graphite materials denoted with solid and dashed lines) is the moveable mirror assembly 310 which can slide along a path parallel to the axis 308 of the graphite tube 307, which operates in combination with the graphite piston embodiment disclosed in FIG. 3, as a bearing surface.

Specifically, the assembly 310 includes a graphite piston 325, also from graphite often having particles sizes of about 2 microns up to about 5 microns, a density of about 1.8 g/cm$^3$, a flexure strength of about 57 MPa up to about 86 MPa, and a Coefficient of thermal expansion (CTE) of 5.5 $10^{-6}$/C.° up to about 7.5 $10^{-6}$/C.°, in the shape of a cup. The graphite piston 325 has bearing surfaces 318, 319, which couple to an inner surface 327 of the graphite tube 307. The bearing surfaces 318, 319, similar to that in FIG. 1, can be formed as rings, preferably at or near the ends of the piston 325. A spacer portion 316 is again shown integrally formed with graphite piston 325, wherein as before, the outer surface of the spacer portion 316 does not contact the inner surface of the graphite tube 307. Thus, as part of this example design, the assembly 310 is more often supported by and slides within the graphite tube 307 via the bearing surfaces 318 and 319. Also similar to the embodiment discussed in FIG. 1, the spacer portion 316 is of the same graphite material (e.g., a graphite often having particles sizes of about 2 microns up to about 5 microns, a density of about 1.8 g/cm$^3$, a flexure strength of about 57 MPa up to about 86 MPa, and a Coefficient of thermal expansion (CTE) of 5.5 $10^{-6}$/C.° up to about 7.5 $10^{-6}$/C.°, as denoted with solid and dashed lines) utilized in the manufacturing (e.g., machining or molding) of the tube 307 and of course in this example, the graphite piston 325 since it is a monolithic integral part. Also shown is a passive or an active magnetic anti-rotation system 371 often configured with magnetic means 371 and a stationary guide rail 375 positioned substantially parallel to the axis of rotation and at a predetermined radial distance from the mirror assembly 10 for stabilization.

Figures 4A, 4B:
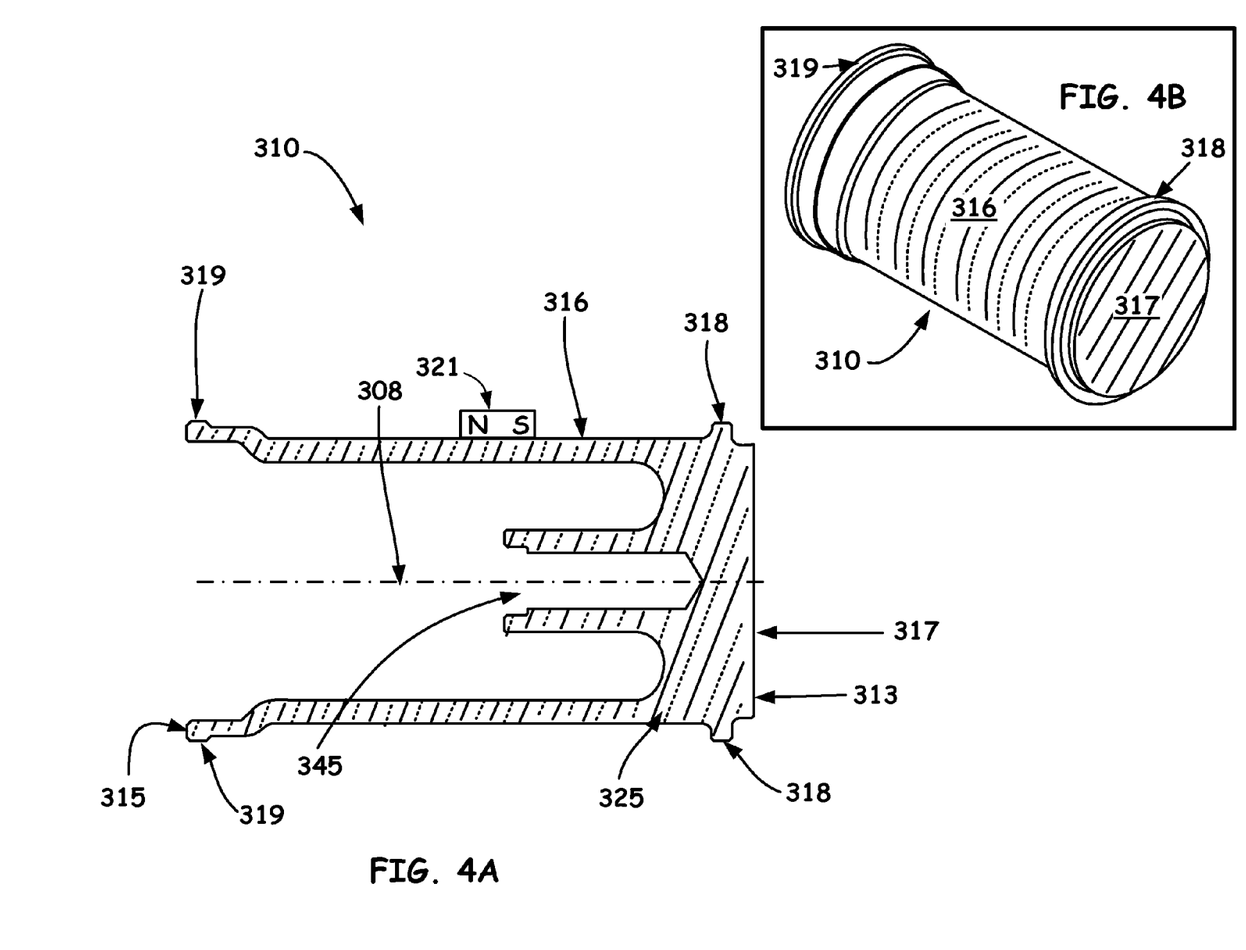
FIG. 4A shows a sectional view of a portion of the moveable assembly of the interferometer shown in FIG. 3.
FIG. 4B shows a 3D perspective view of the portion of the moveable assembly shown in FIG. 4A.

The moveable mirror assembly 310 as shown in FIG. 3, is shown in further detail in FIG. 4A with FIG. 4B again giving the reader a 3D perspective. Specifically, FIGS. 4A and 4B shows the details of the cup-like configuration of the graphite piston 325, the bearing surfaces 318, 319 formed as rings, a planar end 313 configured with a surface roughness so as to provide for a planar reflective surface, as well as an open end 315 configured to receive a movement means, such as, but not limited to a movement coil 313 coupled to a coil support tube 335, and an opening 345 to support handling, as shown in FIG. 3. Similar to the configuration of FIG. 1, a coil of conductive wire or voice coil 313 is thus wrapped around an outside portion of the coil support tube 335. The voice coil 313 can be configured over the full length of the coil support tube 335, but often extends only over a length which is slightly greater than the desired stroke length. Again, lead wires (not shown) couple the voice coil to a generating source (not shown).

Also similar to the configuration of FIG. 1, the voice coil 313 is desirably configured with a length so that at least a portion of it is inside a designed magnetic flux field generated by a magnet assembly (not shown) during operation of the interferometer. When the voice coil 313 has current flowing through it and is within the magnetic flux field, an electromagnetic force results to direct the overall moveable mirror assembly 310 along the axis 308 of the graphite tube 307.

With respect to the graphite piston 325 itself, the outer surface of the planar end 313, as shown in detail in FIG. 4A, is designed with a surface roughness, as stated above, configured to receive a reflective coating 317, as shown in detail in FIG. 4B, of at least 98% at normal incidence that is, as before, useable in the ultra-violet (UV) up to the far-infrared (Far-IR) but preferably useable in the infrared spectrum of about 2 microns up to about 20 microns. The reflective surface itself is often a deposited coating of up to about 2500 angstroms thick applied to the planar surface 313 via deposition (e.g., electrolysis, vacuum deposition) of material such as aluminum, silver, copper, or nickel, but more often gold. As an alternative, broadband or narrowband multilayer coatings can be applied (e.g., via vacuum deposition or sputtering) to also increase the reflectivity up to at least 99.999% for predetermined wavelengths received at the resultant mirror surfaces. Moreover, protective overcoat materials (e.g., aluminum oxide ($AlO_2$), Silicon Oxide ($SiO_2$) or Magnesium Fluoride ($MgF_2$)) can also be added if desired prior to final finishing to improve the robustness of the overall design.

A lift magnet 321, as shown in FIG. 4A, is desirably located on the outer surface of the spacer portion 316 and positioned closer to the center of gravity of the assembly to aid in assisting in movement. In this configuration, because of the use of the all-graphite material arrangement substantially similar to that of FIG. 1, and since the mirror 317 is a deposited coating to the surface 313 of the graphite piston 325 instead of an additional mirrored substrate coupled to the graphite piston 325, this arrangement is even lighter than the configuration of FIG. 1 and thus provides even greater system stability in operation (e.g., less jitter) and the lift magnet arrangement can be even more forgiving.

As before, if the interferometer is utilized so that the moveable assembly 310 is in a horizontal position, the attraction between the lift magnet 321 placed on the upper portion of the spacer portion 316 and the metal of the interferometer hollow cylindrical 306 portion better assists the movement of the assembly 10 than that disclosed in U.S. Pat. No. 5,896,197 by partially alleviating the frictional resistance between the assembly 310 and the lower half of the graphite tube 307. In any event, as before, as the assembly 310 moves, the mirror 317 moves with respect to the beam splitter 302 along a line corresponding to the axis 308 of the graphite tube 307.

Also similar to the first described embodiment, the graphite tube 307 and the graphite piston 325 can have any length desired but preferably the graphite tube 307 is about 5 inches long and the graphite piston 325 is about 3 inches long. The sliding of the assembly 310 within the graphite tube 307 occurs very smoothly due to the graphite/graphite bearing contact, the benefits of which are as similarly detailed above.

The all-graphite bearing assembly according to the example embodiments disclosed herein can be used with a vertical or horizontal interferometer assembly. The terms "vertical" and "horizontal" refer to the relationship of the direction of travel of the moving mirror with respect to gravity. A benefit of the all-graphite bearing is that it provides an even lower weight moveable mirror assembly to that disclosed in U.S. Pat. No. 5,896,197 to enable cheaper and smaller vertical interferometers. A vertical interferometer has several benefits in comparison to a horizontal interferometer. The linear voice coil motor suspends the weight of the moveable mirror magnetically so that the all-graphite bearing has virtually no static loads placed on it, thus reducing the friction. Moreover, the vertical movement of the center of mass of the moveable mirror assembly does not affect the static loading of the bearing system. In a horizontal interferometer the weight of the moveable mirror bends the bearing system as the center of mass moves, thereby causing mirror tilt.

The all-graphite bearing according to the present example embodiment are also capable of being utilized in a horizontal interferometer. When horizontal, the all-graphite bearing has an inherent amount of friction along the bearing surface which provides a simple method for performing an accurate step scan data collection. If the driving means for the moveable mirror assembly is turned off, the friction stops the moveable mirror in a few milliseconds and holds it with a degree of precision that conventional active step scan interferometers cannot achieve without a complicated secondary control system. The trapped air in the narrow bearing clearance provides a damping effect which further contributes to the stopping of the moveable mirror assembly. In addition, this damping renders the interferometer less sensitive to external vibrations.

It is to be appreciated that similar to configurations disclosed in U.S. Pat. No. 5,896,197, and as incorporated by reference in its entirety, a passive or an active magnetic anti-rotation system (generally shown by reference characters 71 and 371 in FIG. 1 and FIG. 3) can be incorporated to limit the mirror rotation (e.g., rotation of mirror 17 in FIG. 1 or mirror 317 in FIG. 3).

It is to be finally noted that example embodiments such as that shown in FIG. 1 and FIG. 3, are often operated via a computer or processor (not shown), which may be a dedicated digital computer or digital signal processor, as known to those of ordinary skill in the art. The computer (not shown) is also often electronically coupled to one or more other analytical instrument as well as output devices, such as display screens, printers, etc. and/or one or more input devices, such as keyboards, internet connections, etc.

Thus a coupled computer or processor can orchestrate the control of the all-graphite moving mirror assembly, e.g., the assembly 10, as shown in FIG. 1, along with any other optical elements (e.g., other reflectors, sensors, sources, etc.), that can be incorporated to operate with the interferometer embodiments disclosed herein. Instructions can also be executed as provided and stored on a machine-readable medium (e.g., a computer-readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software. In particular, the computer-readable media can often include local or remote memory storage devices, such as, but not limited to, a local hard disk drive, a floppy disk, a CD-ROM or DVD, RAM, ROM, a USB memory device, and even any remote memory storage device known and understood by those skilled in the art.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. An all-graphite bearing for an interferometer, comprising:
   a base configured with a bore;
   a hollow graphite tube fixedly disposed within said bore; and
   a monolithic graphite member disposed within said hollow graphite tube and manufactured from the same grade graphite material as said hollow graphite tube, said monolithic graphite member having an end coupled to a reflective surface, wherein said monolithic graphite member is additionally configured for slidable movement parallel to the central axis of said hollow graphite tube.

2. The all-graphite bearing for an interferometer of claim 1, wherein said graphite material comprises a graphite having particles sizes of about 2 microns up to about 5 microns, a density of about 1.8 $g/cm^3$, a flexure strength of about 57 MPa up to about 86 MPa, and a Coefficient of thermal expansion (CTE) of 5.5 $10^{-6}/C.°$ up to about 7.5 $10^{-6}/C.°$.

3. The all-graphite bearing for an interferometer of claim 1, wherein said reflective surface is a deposited coating on a planar surface of said first end of said monolithic graphite member.

4. The all-graphite bearing for an interferometer of claim 1, wherein said reflective surface is integral to a substrate coupled to said first end of said monolithic graphite member.

5. The all-graphite bearing of claim 3 or claim 4, wherein said reflective surface has a reflectivity of at least 98% at normal incidence in the infrared spectrum of about 2 microns up to about 20 microns.

6. The all-graphite bearing of claim 1, further including a movement means comprising a coil support tube and a voice coil.

* * * * *